W. A. GWYNN.
HEATER FOR DENTAL VULCANIZERS.
APPLICATION FILED JULY 1, 1915.
1,184,949.
Patented May 30, 1916.
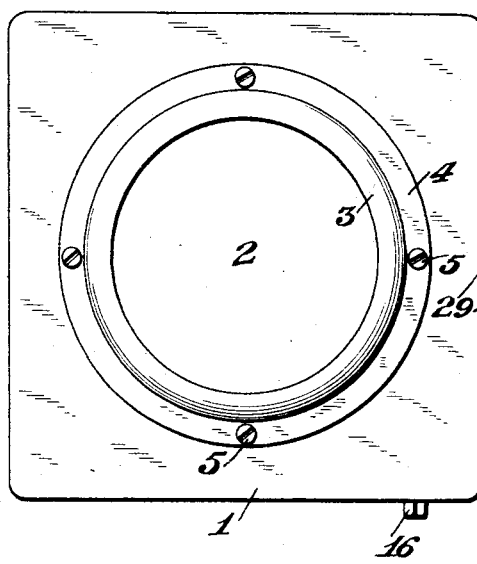
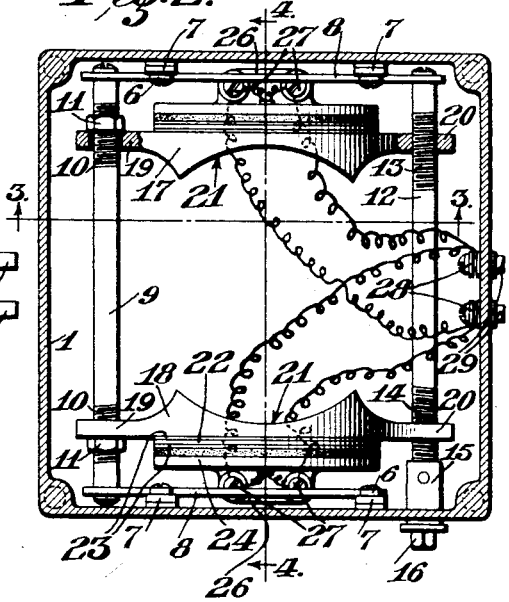
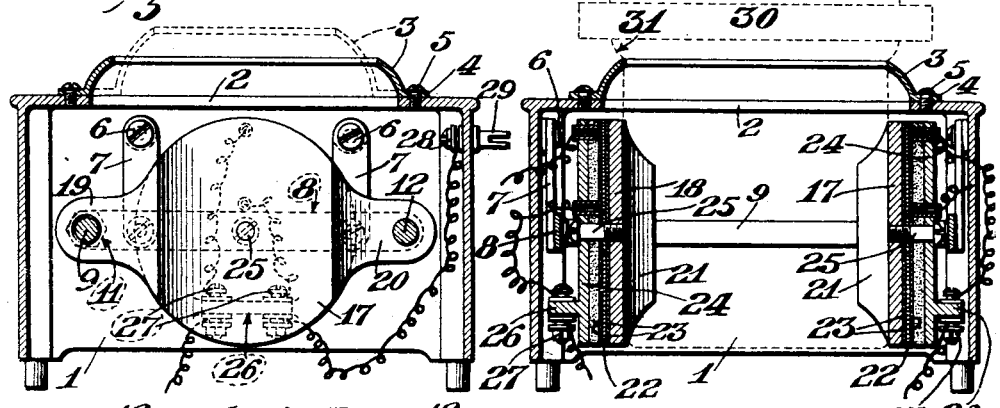
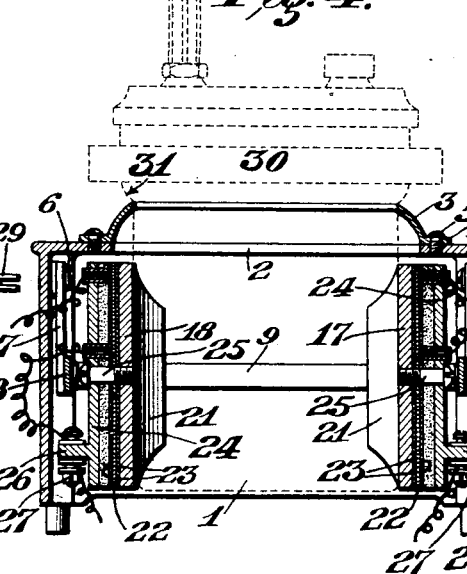
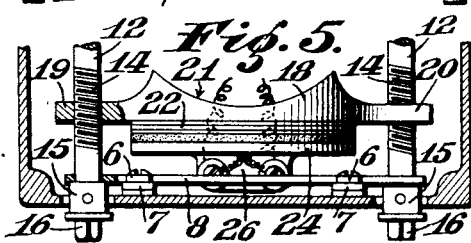
Inventor:
William A. Gwynn,
By his Atty.

UNITED STATES PATENT OFFICE.

WILLIAM A. GWYNN, OF ST. LOUIS, MISSOURI.

HEATER FOR DENTAL VULCANIZERS.

1,184,949.  Specification of Letters Patent.  Patented May 30, 1916.

Application filed July 1, 1915. Serial No. 37,504.

*To all whom it may concern:*

Be it known that I, WILLIAM A. GWYNN, a citizen of the United States, residing in the city of St. Louis and State of Missouri, have invented new and useful Improvements in Heaters for Dental Vulcanizers, of which the following is a specification.

This invention relates more particularly to the heating of dental vulcanizers, but without limitation thereto.

It has for its objects to produce a simple and efficient device to which may be applied an ordinary dental vulcanizer; to produce an adjustable and compensating structure which will accommodate vulcanizers of different sizes; and to attain certain advantages which will hereinafter more fully appear.

An adaptation of the invention is illustrated in the accompanying drawing, in which—

Figure 1 is a plan view; Fig. 2 is a view partly in horizontal section and partly in plan; Fig. 3 is a section on the line 3—3 of Fig. 2; Fig. 4 is a section on the line 4—4 of Fig. 2; and Fig. 5 is a fragmentary view illustrating a modification of the adjustable and compensating support for the heating members.

Referring now to these drawings, the numeral 1 indicates a rectangular hollow casing open at its bottom and provided in its top with a central circular opening 2. About this opening 2 is arranged a tapered collar 3, said collar providing a support for a dental vulcanizer, as will be hereinafter more fully described. The collar 3 is provided with a flange 4 which is perforated for the reception of securing screws 5, by which arrangement the collar is removable. In practice a set of these collars of different diameters and heights will be provided for each heater so as to accommodate vulcanizers of different sizes, the illustration of the collar being more clearly shown in Fig. 3, wherein one is shown in full lines and another of smaller diameter and greater height in dotted lines.

Pivotally supported on opposite sides of the casing 1, as at 6, are links 7. To the lower ends of these links are pivotally attached parallel horizontal bars 8. The bars 8 are connected at one end by a cross rod 9, said cross rod being provided near its ends with screw threads 10 on which portions are nuts 11. The opposite end of one of the bars 8 has swiveled thereto the end of a rod 12, said rod being provided near its ends with right and left hand screw-threads 13 and 14, respectively, the end of the rod opposite to that which is attached to the bar 8 being mounted in and pinned to a sleeve 15 which has a bearing in an opening in the side wall of the casing 1, said sleeve 15 being provided outside the casing with a squared portion 16 for the attachment of a key, or being otherwise provided with means whereby the rod may be rotated.

Oppositely-disposed heating members 17 and 18 are mounted on the rods 9 and 12, said members being provided with oppositely-projecting ears 19 and 20, the ears 19 being provided with apertures which fit the rod 9 loosely, and the ears 20 being provided with counterpart screw-threaded apertures to fit the respective screw-threaded portions 13 and 14 of the rod 12.

The heating members 17 and 18 are substantially circular except for the ears or extensions 19 and 20, and the opposed faces of the two elements are concaved, as at 21, so as to engage the cylindrical body portion of an ordinary dental vulcanizer. Mounted on the outer faces of the members 17 and 18 are electrical heating elements 22, the same, as indicated more clearly in Fig. 4, comprising a coil of wire interposed between two layers of mica 23 or other suitable insulation material. Interposed between the coil and a clamping plate 24 is a layer of asbestos, each of the plates 24 being provided with a central aperture through which is inserted a securing screw 25 whose threaded end portion is received in a screw-threaded aperture in the respective heating members 17 and 18. The clamping plates are provided on their outer faces with lugs 26 on which are mounted binding posts 27, said binding posts being suitably insulated with respect to the lugs 26. There is a pair of these binding posts for each heating member, one end of the wire coil being attached to the one post, and the opposite end of the coil to the other post. Mounted on the side wall of the casing 1, but suitably insulated therefrom are two binding posts 28, said binding posts being respectively connected by wires to corresponding binding posts 27. The binding posts 28 are provided with contact plugs or terminal extensions 29 adapted for the attachment of a key socket or other suitable attaching means at the terminals of distributing wires of any suitable source of electrical energy (not shown).

In using the device, a collar 3 of the proper size for the vulcanizer 30 to be heated is secured on the casing 1. The vulcanizer, indicated by dotted lines in Fig. 4, is inserted through the opening in the collar, the flange or shoulder 31 of the vulcanizer resting on said collar. The nuts 11 having been adjusted on the rod 9 according to the diameter of the vulcanizer, the rod 12 is rotated until the heating members 17 and 18 are drawn into contact with the shell of the vulcanizer, the arrangement of the links 7 and bars 8 affording a compensating support for the heating members so that the latter are readily brought into proper engagement with the vulcanizer should the latter not be exactly centered on the supporting collar 3, the nuts 11 on the rod 9 acting as thrust collars for the heating members. Hence it is only necessary to manipulate the rod 12 having the right and left hand screw-threaded portions 13 in order to bring the heating members 17 and 18 into engagement with the vulcanizer and to move them out of engagement therewith.

As shown in Fig. 5, the structure may be modified by dispensing with the rod 9 and substituting therefor a duplicate of the adjusting rod 12, and providing the apertures in the ears 19 of the heating members 17, 18, with screw-threads the same as the ears 20. In this modification, also, each of the adjusting rods 12 is mounted at both ends on the horizontal bars 8 and projected at one end through openings in the casing 1 with considerable clearance, so as to permit sufficient swinging motion of the compensating support for the parts afforded by arrangement of the links 7 and said bars 8.

Obviously the device admits of considerable further modification without departing from the spirit of the invention. Therefore I do not wish to be limited to the exact construction and arrangement shown.

I claim:

1. In a device of the character described, a support for the utensil to be heated, a pair of oppositely-disposed heating members, and means for moving said heating members into contact with the utensil.

2. In a device of the character described, a support for the utensil to be heated, a pair of oppositely-disposed clamping members, an electrical heater carried by each of said clamping members, and means for moving said clamping members into contact with the utensil.

3. In a device of the character described, a support for the utensil to be heated, a pair of oppositely-disposed heating members, and means for moving said heating members simultaneously into and out of engagement with the utensil.

4. In a device of the character described, a support for the utensil to be heated, a pair of oppositely-disposed heating members, and a compensating support for said heating members, said support including means for moving said heating members simultaneously into and out of engagement with the utensil.

5. In a device of the character described, a hollow casing, said casing having an opening in its top and being provided with a support adjacent to said opening for the utensil to be heated, a heating member movably supported within said casing, and means for moving said heating member into and out of engagement with the utensil.

6. In a device of the character described, a hollow casing, said casing having an opening in its top and being provided with a support adjacent to said opening for the utensil to be heated, a pair of oppositely-disposed heating members within said casing, and a compensating support for said heating members, said support including means for moving said heating members simultaneously into and out of engagement with the utensil.

7. In a device of the character described, a hollow casing having a circular opening in its top, a collar surrounding said opening and arranged and adapted to support the utensil to be heated, a pair of oppositely-disposed heating members within said casing, the opposed faces of said heating members being concaved, and means for moving said heating members with their concaved portions into and out of engagement with the utensil.

8. In a device of the character described, a hollow casing having an opening in its top, and being provided with a support adjacent to said opening for the utensil to be heated, a pair of oppositely-disposed heating members within said casing, and a compensating support for said heating members, said support comprising a pair of parallel horizontal bars each of said bars being suspended by pivotal links, said bars being connected at one end by a cross rod, and said cross rod having adjustable thrust collars thereon, said heating members having apertured portions fitted loosely on said rod in coöperative relation to said thrust collars, and a rotatable adjusting rod having a swivel connection at one end with the end of one of said parallel horizontal bars, and a bearing at its opposite end on said casing, said adjusting bar having right and left handed screw-threaded portions, respectively, and said heating members having screw-threaded apertured portions fitted to the respective screw-threaded portions of said rod.

In testimony whereof, I have hereunto set my hand.

WILLIAM A. GWYNN.